March 16, 1937. H. B. ALLEN 2,074,296
APPARATUS FOR MAKING COMPOSITE METALS
Filed June 14, 1935   3 Sheets-Sheet 2
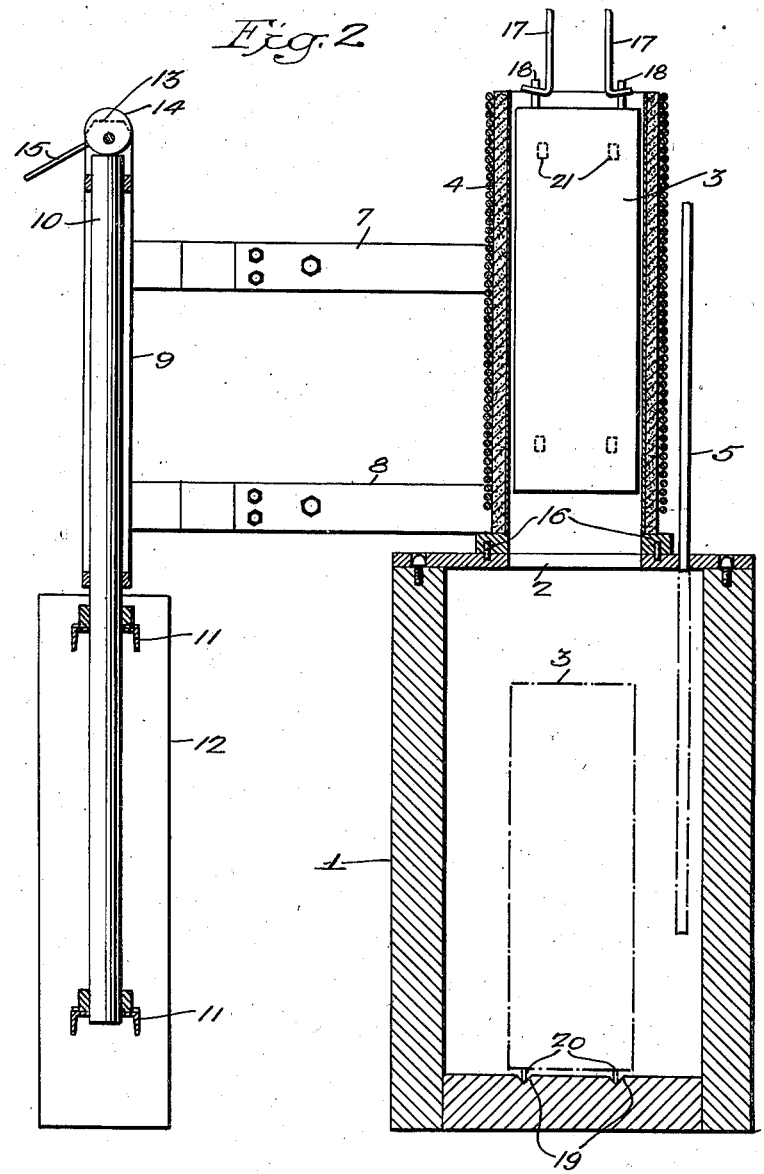
Inventor:
Henry B. Allen
by his Attorneys
Howard & Howard March 16, 1937. H. B. ALLEN 2,074,296
APPARATUS FOR MAKING COMPOSITE METALS
Filed June 14, 1935 3 Sheets-Sheet 3
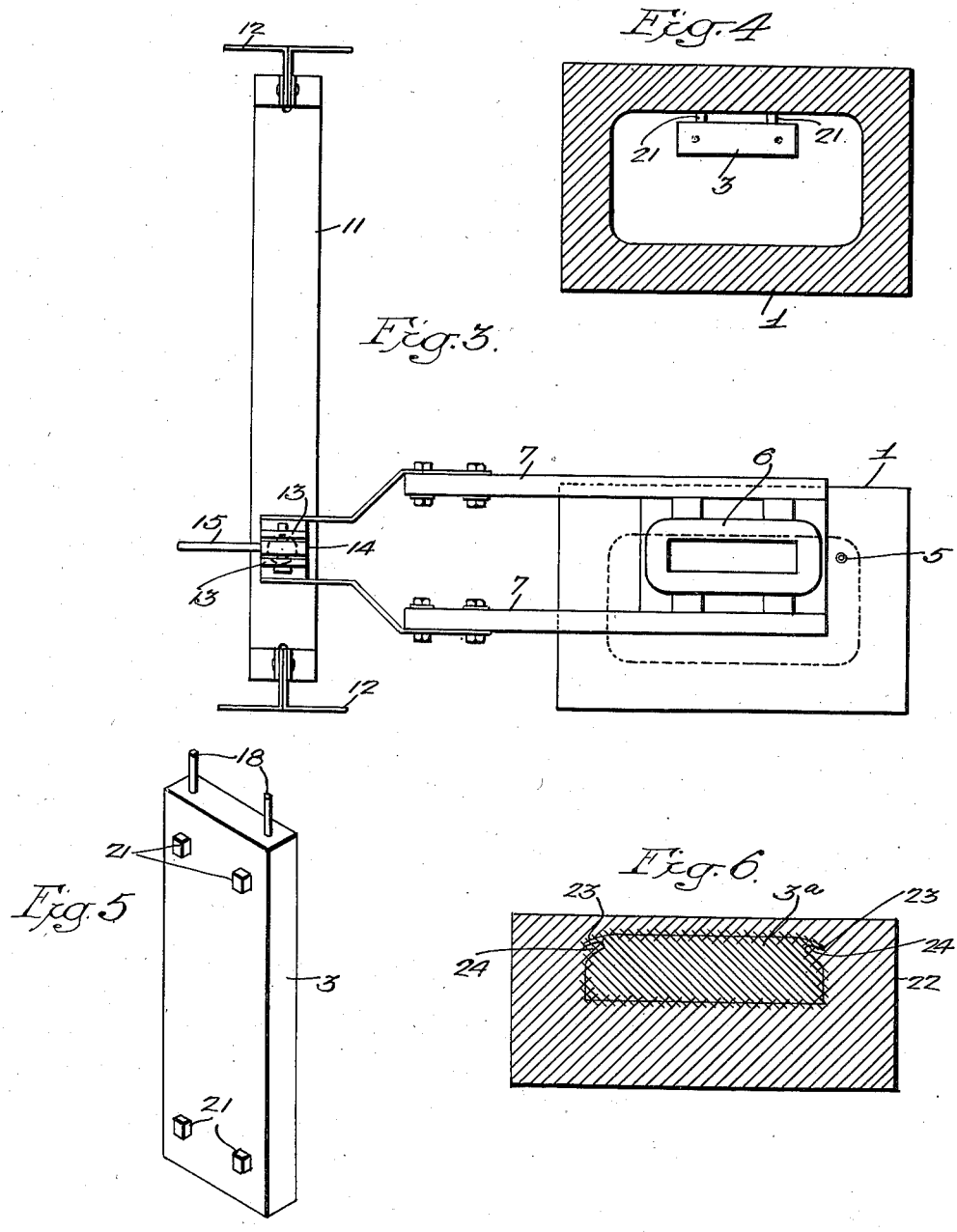

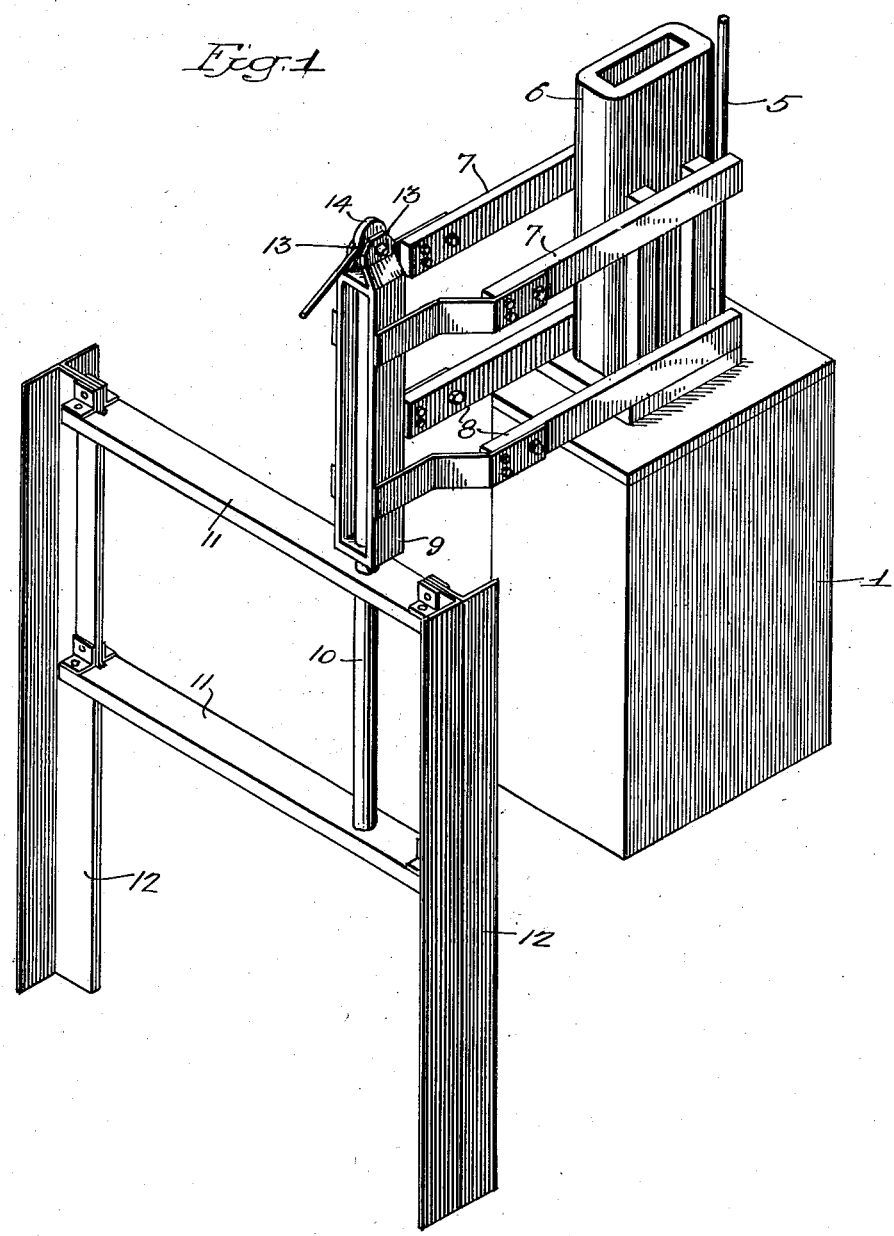

Patented Mar. 16, 1937

2,074,296

UNITED STATES PATENT OFFICE 2,074,296

APPARATUS FOR MAKING COMPOSITE METALS

Henry B. Allen, Philadelphia, Pa., assignor to Henry Disston and Sons, Inc., Philadelphia, Pa., a corporation of Pennsylvania Application June 14, 1935, Serial No. 26,690

7 Claims. (Cl. 22—60)

This invention relates to a novel composite metal structure, particularly a composite steel, and to a novel method and apparatus whereby the novel structure may be produced. The principal object of the invention is to provide a novel method whereby two or more metals of high melting points, and of different compositions or physical properties, particularly steels, may be welded together. The invention is applicable, for example, to the production of composite steel for use in cutting tools wherein the cutting edges are made of tool steel and the backing is made of mild steel. The invention is not thus limited, however, and is applicable in any instance where a composite metal structure may be employed.

Heretofore, the joining of two or more metals has been accomplished in various manners, for example, by hammer welding, roll welding, by casting one metal against another, or by a combination of these methods. The principal difficulty encountered in all of these prior methods has been to bring the metals of high melting points into necessary intimate contact so that there will be atomic contact and thus a transfusion of one metal into another to produce a perfect joint. In these prior methods, oxidation of one or both of the metallic surfaces to be joined has prevented the intimate atomic contact which is essential to the production of a perfect joint or weld between the metals. Some of the prior methods have made use of various fluxing substances which flux with the oxide present on the metallic surfaces and protect the surfaces from air. The fluxed surfaces are then joined together into intimate contact with each other at the necessary temperature.

In instances where one metal has been cast against or around another metal, ofttimes a union weld has not been obtained in the casting but was produced when the metal was subsequently hot worked. In other such cases, fluxes have been used or another metal has been employed in the joint which would alloy more readily with the metals to be joined. Certain steels are more difficult to unite than others, principally due to alloys present which form oxides that are not fluxable by any ordinary practical means. Chromium is one such alloy and therefore, steels containing appreciable quantities of this element cannot be welded by ordinary means. Stainless steels, for example, commonly containing over 10 percent of chromium, owe their corrosion resistance to an invisibly thin resistant surface film of oxide which is instantly formed at room temperature, thus protecting the steel from rusting. Such an oxide coating forms a barrier to atomic contact between the parent metal and the other metal to be joined therewith and a union cannot be effected in the ingot. While some union can be obtained in subsequent forging and rolling operations, provided the imperfect joint is sealed against air and furnace gases, the hot working has to be conducted at very high temperatures which may be deleterious to one of the steels. In any event, such a method is only usable for material to be subsequently hot worked.

The present invention provides a novel method for combining two or more metals having high melting points, such as steels, in a manner to effect an adequate union of the metals in the casting operation. The term "metals having high melting points" includes those having melting points above say 2000° F. By this method, atomic contact of the metal surfaces and, therefore, alloying of the surfaces is accomplished in the casting operation. It is possible by this method to weld together steels which have heretofore been unweldable by the prior processes. The process includes the use of a non-oxidizing atmosphere prior to and during the welding step. While carbon dioxide and nitrogen may be employed, the presence of an active reducing gas such as hydrogen and carbon monoxide gives superior results. The reducing gas may be employed in a relatively pure condition or it may be diluted with a non-oxidizing gas. By the use of the reducing gas, oxide is not only prevented but the invisible layer, which is always present on steel surfaces, is reduced so that the molten metal comes into atomic contact with the solid base metal and immediately diffuses into the surface of the base metal. There is thus obtained an adequate weld.

The invention may be more clearly understood by reference to the accompanying drawings, wherein there is illustrated one form of apparatus by means of which the method may be practiced, although it will be understood that the method may be practiced in any desired manner by any suitable means.

In the drawings:

Figure 1 is a perspective view of the apparatus;

Fig. 2 is an elevational section of the apparatus;

Fig. 3 is a plan view of the apparatus;

Fig. 4 is a sectional plan view taken through the mold;

Fig. 5 is a perspective view of the insert or base metal body employed in the process; and Fig. 6 is a sectional plan view illustrating a modification.

Referring particularly to Figs. 1 to 3 of the drawings, there is provided a mold 1 having opening 2 at the top thereof. In accordance with the method of the invention, an insert or body 3, formed of one of the metals to be joined and which constitutes the base metal in the casting operation, is heated outside the mold, for example by means of a high frequency induction heating unit comprising a coil 4. It will be understood, of course, that any suitable means may be employed to heat the insert or body 3. The insert or body is heated to an elevated temperature below its fusion temperature. During this heating process, a reducing gas, such as hydrogen is introduced into the mold, for example, by means of a supply pipe 5 extending through the top of the mold and which may initially take the position shown in dot-and-dash outline. During the preheating of the insert or body 3, therefore, a reducing atmosphere is established and maintained within the mold and about the insert or body since the reducing gas flows upward through the opening 2 and about the insert or body.

Following the preheating of the insert or body 3, it is lowered into the mold; for example, into the position shown in Figs. 2 and 4. The reducing gas is continuously supplied to the mold, and in the presence of the reducing atmosphere, the molten metal is poured into contact with the insert or body 3, the supply pipe for the reducing gas being raised during the pouring operation to maintain it above the rising level of the poured metal. In order to prevent explosions which might otherwise occur, the reducing gas is lighted upon being placed in the mold, and the flame continues in the mold until the oxygen has been consumed. Thereafter, the burning takes place at the point at which the gas escapes from the mold. The casing or molten metal has a temperature which is substantially above its fusion temperature and also above the fusion temperature of the base metal of the insert. Moreover, the temperature of the molten metal bears such relation to the temperature of the preheated base metal that when the molten metal is brought into contact with the surface of the base metal, it causes a diffusion of the two metals at the surface of the base metal insert. As this takes place in the presence of the reducing gas or in a reducing atmosphere, atomic contact between the molten metal and the base metal is established, thus making possible the diffusion of the two metals, one into another.

Considering further the illustrated apparatus by which this method may be performed, the heating coil structure 6 is carried by a supporting structure comprising upper and lower pairs of arms 7 and 8, respectively, which in turn are carried by and extend outward from a supporting yoke 9. The supporting yoke is rotatably and slidably mounted upon the vertical rod or shaft 10 which, in turn, is fixedly supported by transverse channel members 11. The channel members are secured to the upright angle supports 12.

At its upper end, the supporting yoke 9 is provided with extended ears 13 which pivotally carry therebetween an eccentric cam member 14 having an extending operating handle 15. The cam member engages the upper end of the rod or shaft 10 as clearly illustrated in Fig. 2. It will now be apparent that by turning the cam member by actuating the handle 15, the coil-supporting structure may be raised relative to the mold and when thus raised, this structure may be rotated to move the heating coil away from the mold opening 2, it being remembered that the yoke 9 is rotatably mounted upon the shaft or rod 10. When the coil-supporting structure is in operative position, however, the coil is disposed above the opening 2, as illustrated in Fig. 2, and in order to insure proper positioning of the coil relative to the mold opening, there may be provided complementary pins and recesses in the coil support and the upper wall of the mold as shown at 16, whereby the coil structure may be maintained in proper position.

To support the insert or body 3 within the heating coil during the preheating operation above mentioned, there are provided supporting rods 17, whose lower ends are adapted to engage upwardly-extending pins 18 provided at the top of the insert or body 3. These supporting rods are of such nature that they will hold the insert or body securely during the preheating operation but may be readily released from the pins 18 after the insert or body has been lowered to the position shown in dot-and-dash line in Fig. 2. To insure the proper position of the insert or body within the mold, the mold may be provided with the recesses 19 which are adapted to receive pins 20 provided at the bottom of the insert.

In many instances, the insert or body 3 will be disposed at or near the surface of the completed composite metal body and to this end, the insert will be positioned relative to the side walls of the mold as illustrated in Fig. 4, there being provided on the insert projections 21, serving to maintain the insert in proper spaced relation with respect to the wall of the mold. This insures that the molten metal, when it is poured into the mold, will contact the desired surfaces of the insert, particularly at the corners of the insert nearest the mold wall. This is very important because in practice, it is found that the molten metal chills more rapidly along the wall of the mold nearest the insert and it is important, therefore, that intimate contact of the molten metal with the insert be insured at that point.

In Fig. 6, there is illustrated a modified form of the insert or base metal body 3a to insure adequate bonding or welding of the metals at the points above mentioned. In this figure, the composite metal structure is shown after completion, the cast metal being illustrated at 22 and having the contour or shape of the interior of the mold. The diffusion of the metals is clearly illustrated. It will be noted that at the edges of the insert above mentioned, there are provided relatively thin fins 23 which may be formed by cutting the grooves 24 and then bending the fins to the position illustrated. This fin structure at the points where the molten or cast metal is prone to chill quickly insures diffusion of the metals and an adequate bond, thereby eliminating any possibility of a poor bond or weld due to excessively rapid chilling of the molten metal. It will be understood that any other desired modification of the insert may be employed to effect the desired purpose.

If desired, the insert or base metal body may be preheated in a manner to provide a temperature gradient therealong to compensate for the non-uniformity of temperature of the interior of the mold and of the insert during pouring of the molten metal. During the pouring operation, the bottom of the mold naturally chills more quickly and the non-uniformity of cooling is aggravated by the fact that the stream of molten metal flowing into the mold heats the upper part of the mold, as well as the upper part of the insert, by radiation. There is also heat conduction from the bottom of the insert toward the top thereof. To compensate for these factors, the insert may be heated to a higher temperature at its bottom than at its top and the proper temperature gradient may be established along the insert which will give uniformity of temperature throughout the welding process. This manner of preheating the insert may be effected in any suitable manner. For example, in the case of the heating means illustrated on the drawings, the coil 4 may be designed to effect differential heating of the insert.

In a typical example in which the invention was employed, it was desired to form a composite steel ingot seven inches wide, three inches thick and twenty inches long. The insert or base metal body was four inches wide, one inch thick and sixteen inches long. This insert was formed of high carbon, high chromium steel having a carbon content of 1.50 to 2.00 per cent and a chromium content of 12 to 14 per cent. The insert was preheated to a temperature of 1500° F. at its bottom and 1200° F. at its top. The reason for this differential heating was to compensate for the more rapid chilling of the molten metal at the bottom of the mold during pouring or casting and for the heating effect of the stream, as above mentioned.

The molten metal consisted of low carbon steel having a carbon content of .20. This metal was heated to a temperature of 2900 to 3000° F. It was poured into the mold in a stream five-eighths of an inch in diameter having a ferrostatic head of two to four inches. A cast iron standard split mold was employed having a wall thickness of three-fourths of an inch. The mold temperature was 300 to 400° F. Hydrogen gas was employed as the reducing agent to free the mold of oxygen and to reduce the surface of the insert during heating.

In any particular instance, the dimensions of the mold and of the insert or base metal body, the wall thickness of the mold, the natures of the metals employed, and the temperatures used, are factors which must be taken into consideration, as they will affect the bond or weld of the metals which is obtained. In other words, the conditions must be adjusted for any given composition of steel insert so that the surface thereof is raised to a sufficient temperature by the molten metal to permit the transference or diffusion of the insert and molten metal into the other at the point of union. At the same time, the maximum surface temperature must not prevail for too long a time, for otherwise metal will be washed away from the surface of the insert and the molten metal will be contaminated thereby. In general, however, the temperatures of the metals must bear the relation above mentioned and the other factors must be governed accordingly to obtain the desired result.

The invention is applicable to various metals, although it is particularly applicable in the welding of low carbon steel to high carbon steel or vice versa. Other examples of uses to which the invention may be put are the welding of steel to iron and the welding of alloys of high melting point metals, such as nickel, cobalt, chromium, etc. The invention may be employed to weld heat-resisting alloys or corrosion-resisting alloys to steel or to each other. Various other specific uses of the invention are possible. The method of the invention, as previously stated may be carried out in various types of apparatus, for example the cold insert may be placed in a mold, and heated therein to the desired temperature by any suitable source of heat, such as a gas flame or an induction coil, during which heating and the subsequent pouring of the molten metal, a reducing atmosphere is maintained in the mold by the continuous introduction of hydrogen or other reducing gas.

Although the invention has been described with reference to a specific example and a specific form of apparatus for performing the method, it is susceptible to modification while still retaining the principles and features which characterize it. It will be understood, therefore, that the invention contemplates any such modifications.

I claim:

1. Apparatus for forming a composite metallic structure, comprising a mold having an opening at the top thereof, a heating unit, means for movably supporting said unit above said opening, means for introducing a reducing gas into the mold, and means for supporting a base metal body in cooperative relation with said unit, and for lowering the heated body into the mold, whereby the said body may be preheated to an elevated temperature below its fusion temperature, and a molten metal may be poured through said opening into the mold in contact with the heated body in the presence of the reducing gas, to effect diffusion of the metals into each other.

2. Apparatus for forming a composite metallic structure, comprising a mold having an opening at the top thereof, a heating unit, supporting means for said unit, means for moving said unit-supporting means into and out of cooperative relation with said opening, whereby said unit may be positioned above said opening at will, means for introducing a reducing gas into the mold, and means for supporting a base metal body in cooperative relation with said unit, and for lowering the heated body into the mold, whereby the said body may be preheated to an elevated temperature below its fusion temperature, and a molten metal may be poured through said opening into the mold in contact with the heated body in the presence of the reducing gas, to effect diffusion of the metals into each other.

3. Apparatus for forming a composite metallic structure, comprising a mold having an opening at the top thereof, a heating unit, supporting means for said unit, means for removably interlocking said unit-supporting means with the top of said mold to position said unit properly with respect to said opening, means for moving said unit-supporting means into and out of cooperative relation with said opening, whereby said unit may be positioned above said opening at will, means for introducing a reducing gas into the mold, and means for supporting a base metal body in cooperative relation with said unit, and for lowering the heated body into the mold, whereby the said body may be preheated to an elevated temperature below its fusion temperature, and a molten metal may be poured through said opening into the mold in contact with the heated body in the presence of the reducing gas, to effect diffusion of the metals into each other.

4. Apparatus for forming a composite metallic structure, comprising a mold having an opening at the top thereof, a heating unit, supporting means for said unit, means for moving said unit-supporting means into and out of cooperative relation with said opening, whereby said unit may be positioned above said opening at will, said last means comprising a supporting structure for said unit-supporting means mounted for rotary movement laterally of said opening, means for introducing a reducing gas into the mold, and means for supporting a base metal body in cooperative relation with said unit, and for lowering the heated body into the mold, whereby the said body may be preheated to an elevated temperature below its fusion temperature, and a molten metal may be poured through said opening into the mold in contact with the heated body in the presence of the reducing gas, to effect diffusion of the metals into each other.

5. Apparatus for forming a composite metallic structure, comprising a mold having an opening at the top thereof, a heating unit, rotary supporting means for said unit for moving the unit into and out of cooperative relation with said opening, whereby said unit may be positioned above said opening at will, means for introducing a reducing gas into the mold, and means for supporting a base metal body in cooperative relation with said unit, and for lowering the heated body into the mold, whereby the said body may be preheated to an elevated temperature below its fusion temperature, and a molten metal may be poured through said opening into the mold in contact with the heated body in the presence of the reducing gas, to effect diffusion of the metals into each other.

6. Apparatus for forming a composite metallic structure, comprising a mold having an opening at the top thereof, a heating unit, a vertical supporting member, supporting means for said unit rotatably and slidably mounted upon said member, whereby said unit may be positioned directly above said opening at will, means for introducing a reducing gas into the mold, and means for supporting a base metal body in cooperative relation with said unit, and for lowering the heated body into the mold, whereby the said body may be preheated to an elevated temperature below its fusion temperature, and a molten metal may be poured through said opening into the mold in contact with the heated body in the presence of the reducing gas, to effect diffusion of the metals into each other.

7. Apparatus for forming a composite metallic structure, comprising a mold having an opening at the top thereof, a heating unit, a vertical supporting member, supporting means for said unit rotatably and slidably mounted upon said member, whereby said unit may be positioned directly above said opening at will, cooperative means on said unit-supporting means and the top of said mold interlockable upon the said positioning of said unit to maintain said unit in proper position, means for introducing a reducing gas into the mold, and means for supporting a base metal body in cooperative relation with said unit, and for lowering the heated body into the mold, whereby the said body may be preheated to an elevated temperature below its fusion temperature, and a molten metal may be poured through said opening into the mold in contact with the heated body in the presence of the reducing gas, to effect diffusion of the metals into each other.

HENRY B. ALLEN.